United States Patent [19]
Feagin

[11] Patent Number: 5,944,088
[45] Date of Patent: Aug. 31, 1999

[54] CERAMIC SHELL MOLDS AND CORES FOR CASTING OF REACTIVE METALS

[75] Inventor: Roy C. Feagin, Boca Raton, Fla.

[73] Assignee: Remet Corporation, Utica, N.Y.

[21] Appl. No.: 08/964,350

[22] Filed: Nov. 4, 1997

Related U.S. Application Data

[62] Division of application No. 08/456,824, Jun. 1, 1995, Pat. No. 5,738,819, which is a division of application No. 07/007,883, Jan. 28, 1987, Pat. No. 5,535,811.

[51] Int. Cl.$^6$ ............................... B22C 1/00; B22C 3/00; B22C 9/04; B22C 9/10
[52] U.S. Cl. ...................... 164/369; 106/38.22; 164/361; 164/519; 164/529
[58] Field of Search ..................................... 164/361, 369, 164/138, 519, 529; 106/38.2, 38.22

[56] References Cited

U.S. PATENT DOCUMENTS

| | | |
|---|---|---|
| 3,257,692 | 6/1966 | Operhall . |
| 3,537,949 | 11/1970 | Brown et al. . |
| 3,955,616 | 5/1976 | Gigliotti, Jr. et al. . |
| 4,040,845 | 8/1977 | Richerson et al. . |
| 4,140,771 | 2/1979 | Berard et al. . |
| 4,240,828 | 12/1980 | Huseby . |
| 4,412,921 | 11/1983 | Leung et al. . |
| 4,415,673 | 11/1983 | Feagin . |
| 4,588,575 | 5/1986 | David . |
| 4,703,806 | 11/1987 | Lassow et al. . |
| 4,740,246 | 4/1988 | Feagin . |
| 4,787,439 | 11/1988 | Feagin . |
| 4,799,530 | 1/1989 | Sturgis et al. . |
| 5,004,039 | 4/1991 | Feagin . |
| 5,407,001 | 4/1995 | Yasrebi et al. . |

FOREIGN PATENT DOCUMENTS

| | | |
|---|---|---|
| 2-217348 | 8/1990 | Japan . |
| 2-279553 | 11/1990 | Japan . |

OTHER PUBLICATIONS

Principles of Ceramics Processing, 2nd Edition, James R. Reed, pp. 162–164, 1995.

Borom, "Dissolution of Single and Mixed Oxides of Y, La, Al, and Mg in Aqueous Caustic," American Ceramic Society Bulletin, vol. 61, No. 2 (Feb. 1982), pp. 221–230.

*Primary Examiner*—J. Reed Batten, Jr.
*Attorney, Agent, or Firm*—Smith, Gambrell & Russell; Beveridge, DeGrandi, Weilacher & Young Intellectual Property Group

[57] ABSTRACT

Mold coatings that are relatively unreactive with titanium and titanium alloys during casting are prepared from yttria slurries, which may contain other refractory materials, an acid and an inert organic solvent.

22 Claims, No Drawings

CERAMIC SHELL MOLDS AND CORES FOR CASTING OF REACTIVE METALS

This application is a divisional of co-pending U.S. patent application Ser. No. 08/456,824 filed on Jun. 1, 1995 and issued into U.S. Pat. No. 5,738,819, which in turn, is a divisional application of U.S. patent application Ser. No. 07/007,883 filed Jan. 28, 1987 and issued into U.S. Pat. No. 5,535,811, which applications are relied on and incorporated entirely herein by reference.

INTRODUCTION AND BACKGROUND

The present invention relates to ceramic shell molds for the casting of reactive metals, such as titanium, and process of making molds. In more detail, the invention pertains to a slurry containing yttria refractory used as casting compositions to form shell molds, and processes for preparing same. More particularly, the invention pertains to a slurry comprising yttria refractory, an acid, and an organic solvent, for making ceramic shell molds for casting of reactive metals such as titanium and titanium alloys. The compositions of the present invention are characterized by having a desirable shelf life and improved stability. Molds produced in accordance with the present invention are particularly useful because they enable the casting of reactive metals with minimized or essentially no alpha case.

In a further aspect, the present invention relates to ceramic and foundry cores and the yttria slurries used in making them.

Much effort has been devoted for the past 25 years to providing compositions and methods for casting reactive metals, particularly titanium and its alloys, into ceramic molds. This development and the interest in providing this capability was stimulated by activity in the nuclear and aircraft industries where it was necessary to search for high strength and lightweight metals. Titanium, because of its high strength to weight ratio is sought after for use in the aircraft industry.

The melting point of titanium metal is almost 3100° F. and, in the molten condition, reacts with most refractories. Earlier attempts to cast titanium into ordinary foundry molds were unsuccessful due to the undesirable chemical reactions between the hot metal and the surfaces with which it came into contact. For example, reduction of the silica present in such foundry molds produced heavy reaction zones on the casting surface. This reaction layer is known in the industry as "alpha case" and the problems associated therewith have been described in detail in the literature.

Machined and formed graphite molds have been used commercially to make titanium castings. Such molds can be made in such a way as to minimize the alpha case layer. The U.S. Bureau of Mines has supported research for almost 25 years on the casting of refractory metals. Thus, there have been continuing efforts to search for new materials and methods to reduce or eliminate alpha case.

The use of graphite in investment molds has been described in the art in such patents as U.S. Pat. Nos. 3,241,200; 3,243,733; 3,256,574; 3,266,106; 3,296,666 and 3,321,005 all to Lirones. Other prior art which show a carbonaceous mold surface utilizing graphite powders and finely divided inorganic powders called "stuccos" are Operhall, U.S. Pat. No. 3,257,692; Zusman et al., U.S. Pat. No. 3,485,288 and Morozov et al., U.S. Pat. No. 3,389,743. These documents describe various ways of obtaining a carbonaceous mold surface by incorporating graphite powders and stuccos, various organic and inorganic binder systems such as colloidal silica, colloidal graphite, synthetic resin which are intended to reduce to carbon during burnout, and carbon coated refractory mold surfaces. These systems were observed to have the disadvantage of the necessity for eliminating oxygen during burnout, a limitation on the mold temperature and a titanium carbon reaction zone formed on the casting surface.

Further developments including variations in foundry molds are shown in Turner et al., U.S. Pat. No. 3,802,902 which uses sodium silicate bonded graphite and/or olivine which was then coated with a relatively non-reactive coating such as alumina. However, this system still did not produce a casting surface free of contamination.

Schneider, U.S. Pat. No. 3,815,658 shows molds which are less reactive to steels and steel alloys containing high chromium, titanium and aluminum contents in which a mangnesium oxide-forsterite composition is used as the mold surface.

A number of attempts have been made in the past to coat the graphite and the ceramic molds with materials which would not react with the reactive metals being cast. For example, metallic powders such as tantalum, molybdenum, columbium, tungsten, and also thorium oxide had been used as non-reactive mold surfaces with some type of oxide bond. See Brown, U.S. Pat. Nos. 3,422,880; 3,537,949 and 3,994,346.

Operhall, U.S. Pat. No. 2,806,271 shows coating a pattern material with a continuous layer of the metal to be cast, backed up with a high heat conductivity metal layer and investing in mold material.

Basche, U.S. Pat. No. 4,135,030 shows impregnation of a standard ceramic shell mold with a tungsten compound and firing in a reducing atmosphere such as hydrogen to convert the tungsten compound to metallic tungsten or tungsten oxides. These molds are said to be less reactive to molten titanium but they still have the oxide problems associated with them.

Brown, U.S. Pat. No. 4,057,433 discloses the use of fluorides and oxyfluorides of the metals of Group IIIa and the lanthanide and actinide series of Group IIIb of the Periodic Chart as constituents of the mold surface to minimize reaction with molten titanium. This reference also shows incorporation of metal particles of one or more refractory metal powders as a heat sink material. However, even those procedures have resulted in some alpha case problems.

A development by General Electric has provided barrier layers of refractory oxide in a silica bonded mold for casting alloys containing significant amounts of reactive metals; see Gigliotti et al. U.S. Pat. Nos. 3,955,616; 3,972,367 and 4,031,945.

Huseby, U.S. Pat. No. 4,240,828 shows doping a nickel and cobalt alloy with a rare earth metal and casting into a ceramic mold.

In the 1960's, developments at Wright Air Development Center led to the formation of a crucible for melting titanium formed from a titanium enriched zirconium oxide crucible with less reaction to molten titanium than pure zirconium oxide.

Richerson, U.S. Pat. No. 4,040,845 shows a ceramic composition for crucibles and molds containing a major amount of yttrium oxide and a minor amount of a heavy rare earth mixed oxide. Such methods including the making of a titanium metal enriched yttrium oxide were only partially successful because of the elaborate and expensive technique which required repetitive steps.

Molds for casting molybdenum made from zirconium acetate bonded calcia stabilized zirconium oxide have been made by the Bureau of Mines.

Feagin, U.S. Pat. No. 4,415,673 discloses a zirconia binder which is an aqueous acidic zirconia sol used as a binder for an active refractory including stabilized zirconia oxide thereby causing reaction and gelation of the sols. Solid molds were made for casting depleted uranium. A distinction is made in this patent between "active" refractories and refractories which are relatively inert. The compositions of Feagin are intended to contain at least a portion of active refractories. See also Feagin, U.S. Pat. No. 4,504,591.

Adhesive plasters made of a suspension of oxide powder, such as yttrium oxide and an acid are shown in Holcombe et al., U.S. Pat. No. 4,087,573. These compositions are described as being spontaneously hardening and useful for coating surfaces or for casting into a shape. Of particular interest is the coating of graphite crucible used in uranium melting operations.

It is generally recognized in the industry that all commercial processes have some alpha case on their casting. This may range from about 0.005 inches to 0.04 inches in thickness depending on process and casting size. The alpha case must be milled off by chemical means or other means from the casting before a satisfactory casting is obtained. The extra cost imposed by the chemical milling operation is a disadvantage and presents a serious problem from the standpoint of accuracy of dimensions. Normally, the tooling must take into consideration the chemical milling which results in the removal of some of the material in order to produce a casting that is dimensionally correct. However, since casting conditions vary, the alpha case will vary along the surface of the casting. This means that there is a considerable problem with regard to dimensional variation.

Some refractory compositions have been developed that exhibit reduced alpha case and can be used successfully to make production castings by applying the coatings to the wax patterns by special techniques, such as spraying. However, a difficulty arises in that certain refractory mixes do not have a long pot life and gel quickly, even spontaneously with stirring in a few minutes, depending upon exact composition. See Holcombe et al., U.S. Pat. No. 4,087,573.

Accordingly, it would be highly advantageous to have a slurry that is stable at least for several days and preferably for several weeks in order that patterns of the desired shape may be dipped into the slurry according to present production practice.

SUMMARY OF THE INVENTION

The present invention pertains to yttria used in making ceramic shell molds, and in particular to slurry compositions comprising yttrium oxide refractory, an acid, and an organic inert solvent. The yttria refractory can be either fused or unfused, and can be present alone, or along with some other refractory if desired. It is preferred that the yttria be fused and ground to appropriate flour size, but unfused yttria or sintered yttria can also be used. The fused refractory allows for somewhat higher filler loading which decreases the tendency toward minute cracks on firing. Blends of yttria, fused or unfused, with other refractories such as zirconium oxide can be employed in making a mold coating composition.

The invention further relates to the reactive compositions of the yttria refractory, optionally with other refractory materials, and the mold coatings and cast shapes prepared therefrom. The invention also pertains to the method of making the coating compositions and methods of making molds. The invention is of particular interest with respect to the casting of titanium and titanium alloys such as Ti6A14V.

In a further aspect of the invention, the invention pertains particularly to coatings and molds, ceramic and foundry cores for metal casting, and to the use of a slurry of yttria that has good stability and can contain a variety of other refractories, metal powders, and fibers for various applications and purposes.

An object of the invention is to provide a stable composition suitable for making a mold coating which is less reactive with titanium and titanium alloys during casting.

Another object of the invention is to provide a low reactivity mold coating which is characterized by good stability for reactive metal casting.

A further object of the invention is to provide a ceramic mold having a casting surface having low reactivity with reactive metals.

A still further object of the present invention is to provide a process for making an investment casting mold having low reactivity with reactive metals.

A further object of the invention is to provide a ceramic shell mold with a relatively reaction-free surface against which metals may be poured.

Yet another object of the invention is to provide a castable refractory composition of good stability, using a slurry of yttria, and the resulting ceramic body.

A still further object of the present invention is to provide a process for making an investment casting mold having low reactivity with molten titanium, titanium alloys, zirconium and zirconium alloys.

A further object of the present invention is to provide a coating composition suitable for spraying or painting of a foundry mold, foundry and ceramic cores, melting crucible, ladle, or pouring basin to make it more resistant to reactive metals.

A still further object of the present invention is to provide ceramic and foundry cores utilizing a slurry of yttria.

As used herein, the term "reactive metals" means those metals and alloys which may react with or produce a relatively rough mold surface when poured into ordinary investment casting molds having mold surfaces containing one or more of the following refractories: silica, alumina, aluminosilicates, zirconium silicate (zircon) or other oxides and mixed oxides normally used in investment casting molds. Examples of these reactive metals are titanium, titanium alloys such as Ti6A14V, zirconium, zirconium alloys, high carbon steels, eutectic alloys (containing appreciable amounts of tungsten, hafnium, carbon, nickel, cobalt, etc.), aluminum-lithium alloys, nickel base alloys containing appreciable amounts of titanium or aluminum or hafnium or tungsten. The reactive metals are well known in the art and one of the most reactive of all of these metals is titanium.

In accordance with the present invention, there is provided a slurry or suspension type composition containing yttria in finely divided form, either fused or unfused, as the main component. Any additional compatible finely divided refractory can be blended with the yttrium oxide. In particular, suitable refractory materials for this purpose include zirconium oxide, fused zirconium oxide, monoclinic zirconium oxide, cubic zirconium oxide, fused stabilized zirconium oxide having as the stabilizing agent a member selected from the group consisting of calcium oxide, magnesium oxide, yttrium oxide, lanthanum oxide, dysprosium oxide, and other rare earth oxides, blends of zirconium and other constituents in this group, and fused blends of zirconium with other rare earth oxides, and mixtures of any of the above. Generally, the yttria is present as the major refractory component when blended with other refractory materials as mentioned above. The term "rare earth" is used herein to denote a member of the Periodic Table of Elements with an atomic number of 57 to 71.

In a further aspect, the invention resides in a process for making an investment casting mold having low reactivity with reactive metals comprising providing a stable slurry composition or suspension of yttria refractory, organic solvent and acid, applying the slurry to a pattern, exposing the coated pattern to appropriate conditions of moisture to facilitate the formation of a "green bond" and thereafter firing to produce a fired bond.

A still further feature of the invention resides in a process for making a ceramic shell mold comprising coating the outside of a pattern with the afore-described slurry comprising yttria, acid, solvent and any of the above-mentioned additional refractory materials, drying and heating and then firing to form the intended shell mold. In an alternative procedure, before the coating is dry, there is applied thereto a finely divided refractory called a "stucco". The art of stuccoing is well understood. After the stucco is applied, the coating is allowed to dry, the shell is removed from the pattern and fired at a sufficiently high temperature to bond the refractory together.

Also, a further feature of the invention resides in a process for casting a reactive metal in a mold having low reactivity with reactive metals comprising providing a stable suspension of yttria refractory, organic solvent and acid, optionally with other refractory material and/or some water to form a coating composition, applying said coating composition to a pattern shaped in the desired configuration, allowing the coating to react with moisture to gel, heating the resulting coated pattern to a sufficiently high temperature to fire and thereby fusing said coating composition into the desired shape, and thereafter casting said metal into the said desired mold.

A still further feature of the invention resides in a process for making a core wherein a suitable core mold is coated with a slurry comprising yttria, acid and organic solvent. After coating and while the coating is still wet, it can be stuccoed by application of a suitable refractory such as for example fused yttrium oxide and thereafter permitted to dry. After drying a castable mix of any compatible refractory is added to the core mold having the coating applied thereto and the mix is permitted to gel. After gelation, the core can be removed from the mold and fired to bond the coating to the cast back up to thereby form a finished core.

DETAILED DESCRIPTION OF THE INVENTION

The compositions of the present invention can be characterized as suspensions comprising yttria refractory, an inert organic solvent and a suitable acid. It has been found that a small amount of water can be tolerated in these compositions. Typically, the acid used for purposes of the invention, for example, HCl, HNO$_3$, etc., will contain an appreciable amount of water even though the acids are used in small amounts in relation to the total amount of slurry. In carrying out the invention, care should be taken to control the amount of water as the more water that is present, the shorter will be the shelf life ("pot" life) of the slurry. Under ideal conditions, no water should be added to obtain long-time shelf life of the slurry; i.e. up to several months of stability. However, the slurries of the invention can tolerate some water especially if it is desired to use the slurry quickly. Also, such factors as amount of exposure to the atmosphere, particle size of the yttrium oxide refractory, amount of acid used, and whether one wishes a fast setting slurry will influence the water content. If the slurry is to be used quickly as for spraying or drying, then more water should be added so that some setting takes place rapidly during the drying operation and to be less dependent on the humidity conditions of the atmosphere. These are matters that will be apparent to persons skilled in the art.

The yttria slurry is prepared by mixing the components thereof in any convenient manner using conventional equipment. The yttria is in finely divided form, sometimes called "flour". The term "flour" is commonly used in the foundry industry to signify the finely ground refractory materials that are commonly used to prepare slurry compositions. Particle sizes can vary considerably and still be suitable for the intended purposes. In general, however, in the investment casting industry, it means particle sizes below 150 microns can designate sizes down to 1 to 10 microns. A common flour size used in the industry is a flour containing particles essentially 75% finer than 325 mesh (44 microns) and usually has a wide distribution range. The "mesh" sizes refer to U.S. Standard Screen Series.

Another commonly used size in the industry is generally referred to as 325 mesh flour and is understood to mean that at least 95% of the particles pass through a 325 U.S. Standard Screen mesh. In this instance, 95% of the flour particles are finer than 44 microns. Commonly used flours are −150 mesh, −200 mesh and −325 and this is understood to mean that the particles are sufficiently ground so that at least 96% of the particles pass through the designated screen. The distribution of particle size ranges is not generally provided but can be determined by means known in the art. Producers of such flours have been known to provide what is called a "typical" screen analysis of a particular grade with no guarantee that each lot will be the same or conform to the analysis of the "typical" batch. Essential for purposes of the invention is that the flour be of sufficiently fine particle size so that a smooth surface will be provided on the mold.

During the slurry preparation, the acid present will react with some of the yttrium oxide to form an yttrium salt of the acid. This salt then reacts in a manner that is similar to that of calcium sulfate when exposed to moisture; namely, it forms a hydrate of the salt which constitutes the "green bond" when the coated pattern is exposed to a moist atmosphere. This hydrate then dehydrates upon firing to form yttrium oxide which becomes the fired bond.

For purposes of the present invention, refractory powders or aggregate suitable for use in addition to the yttrium oxide for the mold compositions and coatings are those of the following group: monoclinic zirconium oxide, yttrium oxide, cubic zirconium oxide, fused yttrium oxide, fused zirconium oxide, fused stabilized zirconium oxide having as the stabilizing agent a member from the group of calcium oxide, magnesium oxide, yttrium oxide, scandium oxide, the oxides of the lanthanides of the Periodic Table; e.g. lanthanum, cerium, dysprosium, praseudymium, neodymium, samarium, and other rare earth oxides, blends of zirconium and yttrium oxides or with other constituents in this group and fused blends of zirconium and/or yttrium oxide with other rare earth oxides. These may be used in with the yttria in the slurry, or mixtures of one or more thereof may be used.

In accordance with the invention, the slurry also contains as an essential ingredient an acid. The acid used may be any acid that will react with the yttria under normal room temperature conditions to form a salt that will, in turn, form a hydrate. The salt preferably should be totally soluble in the solvent, but partial solubility is satisfactory. The acid also should be essentially soluble in the solvent and should be relatively stable under ambient conditions except for any reaction with the yttria refractory. Examples of suitable acids are organic mono- and polycarboxcylic saturated acids such as formic, acetic, propionic, citric, succinic, oxalic, tricarballyllic, phthalic, maleic and tartaric. Inorganic acids include sulfuric, nitric, hydrochloric and sulfamic. Others may also be used. The concentration of the acid must not be too great so as to appreciably dissolve the yttrium oxide or other refractory substances; it must also not be dilute with water as that will contribute too much water to the system.

The solvent that is present in the slurry in accordance with the invention should preferably be one that does not have a high vapor pressure at room temperature which may cause cooling and possible cracking of the wax pattern upon applying the slurry. It should also not have an extremely low vapor pressure, taking days to dry on the wax pattern. The solvent preferably should be water soluble or partially so to facilitate the hardening of the coating. Solvents that can be used in accordance with the invention are generally inert, organic solvents including but not limited to ketones, lower alkanols and esters such as acetone, methyl isobutyl ketone, methanol, ethanol, butanol, isobutanol, n-propanol, isopropanol, hexanol, methyl ethyl ketone, ethyl acetate, methyl acetate, isopropyl acetate, 1,4-dioxane, ethoxy ethanol (cellosolve), methoxy ethanol (methyl cellosolve), methoxy isopropanol, and others. Blends of solvents can also be used. Higher boiling organic solvents, such as propylene glycol monomethyl ether, carbitol, may also be used in whole or in part but drying time of the coating is extended.

Yttrium salts have the characteristic of forming a hydrate or hydroxysalt in the presence of water. (New Yttria Plasters, C. E. Holcombe, et al., U.S. Department of Energy, Report Y-2104, January 1978). For example, yttrium oxide, when mixed with a dilute acid, such as nitric acid, to form a slurry will gel up into a hardened condition within a short period of time, generally within several minutes.

Because of the reaction of the yttrium salt with water and resulting in a short pot life a slurry can be prepared using a solvent containing no $H_2O$ or having the $H_2O$ at a minimum so that the slurry will be stable for days and weeks. When water is used as the suspending medium the slurries gel or "set" very quickly within minutes or a few hours making it unsuitable for some purposes. The wax patterns may be dipped into the slurry and exposed to the atmosphere which contains some moisture. The moisture in the atmosphere will enter into the reaction with the yttrium salt formed to form a hydrated salt and cause hardening of the coating on the pattern. It may be preferable to expose the moist dipped pattern instead to a controlled high humidity atmosphere and then drying to produce stronger coatings and to have better production control. This technique enables a stable slurry to be used for dipping patterns and then to harden the coating on the pattern after dipping and treatment with stucco.

It may be advantageous to include in the slurry certain other materials such as plastic latexes, film-formers, soluble plastic materials, organic or inorganic fibers, other refractory fillers, etc. The inclusion of certain film formers or plastic materials may be desirable to minimize or prevent penetration of backup slurry media through the first coat or to minimize any spalling or cracking during dewaxing of the finished ceramic shell. Such additives and adjuvants are well known in the art for this purpose.

In another embodiment of the invention, it is desirable to include an yttrium salt in the slurry for greater control of the setting action of the coating. The yttrium salt should be soluble in the solvent and can be used in place of the yttrium oxide and acid combination. Thus, the yttrium salt can replace all, or part of, the yttrium oxide and acid in the slurry composition. The mixture of the yttrium salt is set forth above and one that is capable of forming a hydrate with moisture. Examples of such salts are the acetate, nitrate, chloride, sulfates and any other salt capable of forming a hydrate with water.

A number of experimental slurries were made to determine shelf life of the slurries. These are shown in Tables 1 and 2. These tables illustrate a number of examples of types of solvents and acids used. Unfused $Y_2O_3$ powder (made by precipitation and drying) and sintered $Y_2O_3$ powders were also used. The influence of water additions is noted on the shelf life of the slurry. The presence of water reduces the shelf life and therefore the amount of water should be controlled as previously indicated.

With regard to the yttria powder used in the examples, two types of powder were used. One was obtained from the producer and used as such. The other is a highly sintered powder adjacent to a fused yttrium oxide ingot. The sintered powder is densified from that received from the producer, but is not densified completely to a fused product. Fused ingots were made which were crushed and ground to appropriate sizes for later experiments. Any suitable yttria powder can be used for purposes of the invention such as are commercially available.

TABLE 1

| Formula No. | R08402 | | | | | | | |
|---|---|---|---|---|---|---|---|---|
| Composition: | −37 | −38 | −39 | −41 | −42 | −48 | −53 | −17 |
| $Y_2O_3$ Powd. | 25 | 25 | 25 | 25 | 25 | 25 | 25 | 40 |
| Isopropanol 99.9% | 25 | 25 | 25 | 25 | 25 | 25 | 25 | 25 |
| Citric Mono-Hydrate Acid | 2.5 | 1.25 | 15.0 | 17.5 | | | | |
| 85% Lactic Acid | | | | | | 2.5 | | |
| Stability | 6 mo. | 6 mo. | 6 mo. | 6 mo. | 6 mo. | 6 mo. | 6 mo. | 6 mo. |
| Glac. Acetic | | | | | | | 10.0 | |
| Conc. Nitric | | | | | | | 10.0 | 5.0 |

TABLE 2

| Formula No. | −75 | −76 | −77 | −78 | −81 | −82 | −60 | −61 | −88 | −85 | −11 | −89 |
|---|---|---|---|---|---|---|---|---|---|---|---|---|
| Composition: | | | | | | | | | | | | |
| $Y_2O_3$ Powd. Sintered | 25 | 25 | 25 | 25 | 40 | 40 | | | 40 | 40 | | 50 |
| 3A Ethanol | 25 | 25 | 25 | 20 | | | | | | 20 | | |

TABLE 2-continued

| Formula No. | -75 | -76 | -77 | -78 | -81 | -82 | -60 | -61 | -88 | -85 | -11 | -89 |
|---|---|---|---|---|---|---|---|---|---|---|---|---|
| Conc. Nitric Acid | 5 | | | 5 | | | | | | | | |
| Anhyd. Citric Acid | | 5 | | | | | 5 | 10 | | | | |
| Citric Monohydrate Acid | | | 5 | | 11.6 | 11.6 | | | 18.5 | 11.6 | | 18.5 |
| Dowanol PM | | | | 5 | | | 25 | 25 | | | | |
| Dist. Water | | | | | 1.5 | | | | | 1.5 | | |
| Stability | 3 days | 2 wks | 2 wks | 3 days | 10 days | 2 wks | 2 mo. | 2 mo. | 2 mo. | 10 days | 3 wks. | 2 mo. |
| Isopropanol | | | | | 25 | 25 | | | 20 | | 25 | 20 |
| Glacial Acid Acetic | | | | | | | | | | | 2.5 | |
| $Y_2O_3$ Powder | | | | | 25 | 25 | | | | | 25 | |
| Methanol | | | | | | | | | 7.5 | | | 7.5 |

A number of the slurries were deposited on a sheet of wax, the excess slurry drained off, and exposed to the atmosphere having a humidity above 50% and in most cases as high as 75–80%. These were dried overnight and examined for film strength. Slurries 37, 38, 39, 41, 17, gave some films that were abrasion resistant with 17, 25, 39, 41 being quite hard and strong. Films from -60 and -61 required extensive drying times to acquire strength. Film strengths on 75, 76 and -77 were very strong and abrasion resistant as were 81 and 82. Films from 88 and 89 were very hard and strong after complete drying.

A number of slurries were used to deposit films on wax and immediately after deposition the wax sample with film was placed into a container above water which produced a high humidity atmosphere. These films were quite hard after drying.

In preparing molds for casting in Ti6A14V alloy a number of pattern wax bars approximately ½" to ⅝" in diameter were cut into lengths (fingers) about 4" long. The application of the coating was by dipping the finger into the slurry or spraying the coating on to the wax finger leaving about ½ inch of the finger free. After dipping and draining the moist coating was stuccoed with a coarse fused yttrium oxide of approximate particle size of -40+140 mesh. The coating was then allowed to dry in the atmosphere which was above 50% relative humidity. After drying the pattern was then sealed to a central wax sprue along with several other experimental coated fingers. The uncoated wax sprue was then painted with a fused pure yttrium oxide slurry in colloidal yttria and stuccoed with the fused yttria stucco. It was allowed to dry and then dipped into a backup slurry and stuccoed. The back-up slurry is composed of 30% aqueous silica sol mixed with Remasil 60, 325 mesh to a viscosity of 25 seconds #4 Zahn cup. Seven back-up coats were used. This coating was allowed to harden and was then recoated with the same slurry, and then stuccoing with Remasil 60 having a 50 mesh grain size. This was repeated with the 50 mesh grain size stucco until the total number of coats had been applied to the pattern. The last coating was not stuccoed. After all coats were applied, the molds were allowed to dry thoroughly for several days before dewaxing, although a long dry time is not essential. Remasil 60 is an alumino-silicate refractory of approximately 60% $Al_2O_3$ content supplied by Remet Corporation of Chadwicks, N.Y.

After the final coat was applied, usually 6–8 coats, no stucco was applied to the final coat, the mold was allowed to dry at room temperature. It was then immersed in hot motor oil to remove the wax leaving a shell mold. The resulting shell mold was fired to 2500° F. for two hours and cooled to room temperature.

As a variation of each of the facecoats, a small amount of an acrylic vinyl latex could be added to the slurry to aid in continuous film formation, better adhesion to the wax bar, and to prevent possible penetration of the silica binder to the mold surface during dipping of the backup coats. Several known types of latex can be used if compatible with the slurry.

The refractories and other materials that can be used in preparing the slurries used in accordance with the invention are described as follows:

1. Vinyl-acrylic latex, a commercial product available from several sources; e.g. Air Products Co., used to provide improved film forming properties to the slurry and to prevent penetration of liquids from subsequent coats to the mold surface.

2. A low-foaming wetting agent such as Sterox NJ a product of Monsanto Chemical Co. can be used.

3. 2-ethyl hexanol, a commercial chemical, can be used as a defoaming agent.

4. Glacial acetic acid, a standard commercial product.

5. Fused yttrium oxide, made by electrically fusing a 99.9% $Y_2O_3$ powder and grinding to 200 mesh powder showing 1.9% +200 mesh.

6. Yttria stucco is the same product as 5. but -40+100 mesh particle size.

Each mold was then attached to a sprue connector in the casting box to a centrifugal casting machine. Foundry sand with a minor sodium silicate bond was rammed around the molds in the box. After drying, the box was put under vacuum and degassed in a large chamber and molten commercial titanium alloy 6A14V was poured into the molds under vacuum.

After casting, the molds were cooled, fingers were cut off, sectioned, embedded in plastic and metallographically polished, etched to show up the alpha case, and examined microscopically for alpha case.

Table 3 shows the slurry formulations used for the mold surfaces for each pattern cast.

Table 4 shows the average alpha case measurements on each finger casting. These are very low alpha case values.

TABLE 3

SLURRY FORMULATIONS

| Pattern | SA | SB | SC | SD | SJ | SK | SL |
|---|---|---|---|---|---|---|---|
| Slurry No. | 422 | 423 | 424 | 425 | 460 | 461 | 462 |
| Composition: | | | | | | | |
| Citric Acid Monohydrate | 3.125 | 5.8 | 3.125 | 5.8 | 5.8 | 5.8 | 5.8 |
| 99% Isopropanol | 12.5 | 12.5 | 12.5 | 12.5 | | | |
| 5% Nirez Resin | | | | | 12.5 | | |
| 10% Nirez Resin | | | | | | 12.5 | |
| 15% Nirez Resin | | | | | | | 12.5 |
| Unfused Y$_2$O$_3$ Powder | | | 13.4 | 13.4 | | | |
| Approx. 325 Mesh Fused Y$_2$O$_3$ | 75 | 75 | 40.2 | 40.2 | 70 | 70 | 70 |

TABLE 4

AVERAGE ALPHA CASE DEPTH MEASUREMENTS

| Sample | Case Depth x 0.0001" |
|---|---|
| SA | 9 |
| SB | 13 |
| SC | 12 |
| SD | 21 |
| SJ | 12 |
| SK | 9 |
| SL | 9 |

In Table 4, it is noted that samples SA, SK and SL had very low alpha case. Samples SB, SC and SJ were also good but contained somewhat higher alpha case. Sample SD is higher and may be due to a process defect unknown at this time.

Relative to the proportions of refractory in yttria slurry, in the case of relatively "inactive" refractories such as monoclinic zirconia, tabular alumina, fused silica and zircon, these can vary widely depending upon their particle size distributions, the specific gravity of the refractory, the manner of processing such as injection molding, casting, pressing or dipping, and the application of the mix. In general, when slurries are made for dipping investment casting patterns with fused yttria refractory flour of about 325 mesh, a ratio of one part yttria flour to one part vehicle is about the minimum. As much as two parts of refractory can be used to produce a thick slurry coat. Variations in these proportions may be made depending upon the particular results desired.

It is further advantageous to include refractory fibers with the yttria slurry to produce high temperature refractories. Such fibers include silicon carbide, silicon nitride, carbon fibers, alumina fibers and the like.

Many of the compositions produced from the yttria slurry refractory fiber system may be used for special coatings and for casting shapes when a gelling agent or active refractory is used with the yttria slurry.

The separate slurries made with yttria powder, zircon, alumina and fused silica were deposited on a wax pattern and allowed to dry. The resulting coating was strong and resisted scrapping with a knife. Protective coatings may be applied to many types of surfaces such as ceramics, metals, foundry molds, and for electronic applications. For example, a slurry of citric acid, isopropanol and fused yttria can be used to spray paint or coat a refractory melting crucible to minimize metal crucible reaction. It may also coat a pouring basin or ladle to minimize reaction. In particular, a thin surface layer may be sprayed on to a cope and drag foundry mold and dried to form a strong non-reactive coating for protection when reactive metals, such as titanium are poured into the mold. A single layer is usually sufficient to give good protection.

A preformed ceramic casting core suitable for casting molds for titanium casting was made by coating the inside of the core mold with, for example, a slurry composed of fused yttrium oxide, citric acid and isopropanol to a viscosity of about 20 seconds #4 Zahn cup. A few drops of a non-ionic wetting agent, Sterox NJ, can be added to facilitate wetting of the mold surface. After coating and while the coating is wet, it can be stuccoed with a −40+100 mesh fused yttrium oxide grain. The coating can then be allowed to dry at room temperature. After drying a heavy castable mix of a fused silica refractory of varying particle size distribution from 20 mesh and down and a prehydrolyzed ethyl silicate binder containing 20% SiO$_2$ and some ammonium carbonate gelling agent can be added to the core mold with the above coating and the mix allowed to gel. After gelation, the core can be removed from the mold. It can then be fired sufficiently high to bond both the coating and the cast backup to form a finished core ready for casting.

The refractory mix suitable for the bulk of the core may be any mix that will be compatible with the coating and is primarily used to provide a backing or support for the coating or core surface. If titanium or other reactive metal is poured against the core, the refractory might be yttria. If the metal is less reactive than titanium, it may be alumina, zirconia or some other refractory.

A ceramic core suitable for reactive metal casting and particularly titanium can be made by making a yttria type refractory or other and casting or injection molding or pressing into a suitable mold and allowing the slurry to gel. The gelled body can then be dried and fired and used as a casting core.

Further variations and modifications will be apparent to those skilled in the art from a reading of the foregoing and are intended to be encompassed by the claims appended hereto.

I claim:

1. A coating composition, said coating composition comprising a finely divided yttria, an acid, an inert organic solvent and an additional refractory material.

2. A process of making the coating composition as defined in claim 1 comprising mixing said finely divided yttria, said acid and said organic solvent with said additional refractory material wherein said refractory is selected from a group consisting of yttrium oxide, zirconium oxide, fused yttrium oxide, fused zirconium oxide, fused stabilized zirconium oxide, and a fused homogenous mixture of yttrium oxide and zirconium oxide.

3. A process of making the coating composition as defined in claim 1 comprising mixing said finely divided yttria, said acid, said organic solvent and said additional refractory wherein said refractory is selected from a group consisting of monoclinic zirconium oxide, cubic zirconium oxide, fused stabilized zirconium oxide having a stabilizing agent selected from a group consisting of calcium oxide, magnesium oxide, yttrium oxide, lanthanum oxide, dysprosium oxide, and other rare earth oxides.

4. A process of making the coating composition as defined in claim 1 comprising mixing said finely divided yttria, said acid, and said organic solvent with said additional refractory material.

5. A shaped core comprising a shaped refractory body coated with the coating composition as defined in claim 1.

6. The shaped core according to claim 5, wherein said additional refractory material is selected from a group consisting of yttrium oxide, zirconium oxide, fused yttrium oxide, fused zirconium oxide, fused stabilized zirconium oxide, and a fused homogenous mixture of yttrium oxide and zirconium oxide.

7. The shaped core according to claim 5, wherein the coating composition contains a minor amount of water.

8. The shaped core according to claim 5, wherein said additional refractory material is selected from a group consisting of monoclinic zirconium oxide, yttrium oxide, cubic zirconium oxide, fused yttrium oxide, fused zirconium oxide, and fused stabilized zirconium oxide.

9. The shaped core according to claim 8, wherein said fused stabilized zirconium oxide is present having as a stabilizing agent a member selected from a group consisting of calcium oxide, magnesium oxide, yttrium oxide, lanthanum oxide, dysprosium oxide, and oxides of other rare earth elements from the Periodic Table with an atomic number of 57 to 71, blends of zirconium and/or yttrium oxide with other oxides of a rare earth element from the Periodic Table with an atomic number of 57 to 71.

10. The shaped core according to claim 5, wherein the acid is an organic acid or an inorganic acid, and wherein the acid is capable of reacting with the yttria to form a salt that will hydrate in the presence of moisture.

11. The shaped core according to claim 5, wherein the solvent is an alkanol or a ketone.

12. A mold or core produced by a process comprising applying the coating composition defined in claim 1 to a pattern or mold, allowing the coating composition to dry, applying to the dried coating composition a plurality of layers of the coating composition or a different coating composition to form a finished mold or core.

13. The mold or core according to claim 12, wherein said additional refractory material is selected from a group consisting of yttrium oxide, zirconium oxide, fused yttrium oxide, fused zirconium oxide, fused stabilized zirconium oxide, and a fused homogenous mixture of yttrium oxide and zirconium oxide.

14. A coated body comprising a body and the coating composition defined in claim 1.

15. A process of producing a shaped core comprising
    applying to a pattern or mold the coating composition as defined in claim 1.

16. The coating composition as set forth in claim 1, wherein the additional refractory material is selected from a group consisting of monoclinic zirconium oxide, cubic zirconium oxide, fused stabilized zirconium oxide having as a stabilizing agent a member selected from a group consisting of calcium oxide, magnesium oxide, yttrium oxide, lanthanum oxide, dysprosium oxide, and other rare earth oxides.

17. A process of making the coating composition as defined in claim 16 comprising mixing said finely divided yttria, said acid, and said organic solvent with said additional refractory material.

18. A coated body comprising a body and the coating composition defined in claim 16.

19. A coating composition comprising yttria, an acid, and an organic solvent.

20. A process of making the coating composition as defined in claim 19 comprising mixing said yttria, said acid, and said organic solvent.

21. A shaped core comprising a shaped refractory body having the coating composition defined in claim 19.

22. A coated body comprising a body and the coating composition defined in claim 19.

\* \* \* \* \*